United States Patent [19]

Smith et al.

[11] Patent Number: 5,071,256

[45] Date of Patent: Dec. 10, 1991

[54] EXTRUDER INJECTION APPARATUS AND METHOD

[75] Inventors: Bradley P. Smith, Youngstown, Ohio; Paul N. Colby, New Castle, Pa.

[73] Assignee: Spirex Corporation, Youngstown, Ohio

[21] Appl. No.: 549,974

[22] Filed: Jul. 9, 1990

[51] Int. Cl.⁵ .............................. B01F 7/08; B29B 7/42
[52] U.S. Cl. ........................................ 366/89; 366/319
[58] Field of Search ...................... 366/81, 88, 89, 79, 366/323, 318, 319; 425/208, 209

[56] References Cited

U.S. PATENT DOCUMENTS

| | | | |
|---|---|---|---|
| 3,698,541 | 10/1972 | Barr . | |
| 3,867,079 | 2/1975 | Kim | 425/378 |
| 3,870,284 | 3/1975 | Kruder . | |
| 3,989,941 | 11/1976 | Gasior et al. . | |
| 3,998,438 | 12/1976 | Sokolow | 366/81 |
| 4,015,832 | 5/1977 | Kruder . | |
| 4,092,015 | 5/1978 | Koch | 366/81 |
| 4,128,341 | 12/1978 | Hsu | 366/89 |
| 4,131,368 | 12/1978 | Iddon | 366/81 |
| 4,173,417 | 11/1979 | Kruder | 366/89 |
| 4,197,070 | 4/1980 | Koschmann | 425/135 |
| 4,201,481 | 5/1980 | Iddon et al. | 366/79 |
| 4,215,978 | 8/1980 | Takayama et al. | 425/190 |
| 4,277,182 | 7/1981 | Kruder | 366/89 |
| 4,405,239 | 9/1983 | Chung et al. | 366/89 |
| 4,752,136 | 6/1988 | Colby | 366/89 |
| 4,925,313 | 5/1990 | Nunn | 366/81 |

FOREIGN PATENT DOCUMENTS 61-144326  7/1986  Japan ...................................... 366/88

*Primary Examiner*—Philip R. Coe
*Assistant Examiner*—Scott J. Haugland
*Attorney, Agent, or Firm*—Buchanan Ingersoll

[57] ABSTRACT

A plasticating apparatus and method for its use including a rotating screw having a helical flight disposed within and cooperating with the inner wall of a heated barrel with said barrel provided with inlet and outlet openings so that particles of resinous material are introduced through said inlet opening to a helical valley extending along said flight to be plasticated by said screw and advanced towards said outlet opening. A barrier extends along said helical valley to divide said helical valley into coextensive side by side helical valley sections. The barrier extends in a path which is non-parallel and alternating with respect to the helical flight so that the pitch of the barrier is alternately greater than and less than the pitch of the helical flight. The height of the barrier is less than the height of the flight so that the resinous material overflows the barrier due to changes in width of said side by side helical valley sections.

16 Claims, 2 Drawing Sheets

EXTRUDER INJECTION APPARATUS AND METHOD

BACKGROUND OF THE INVENTION

This invention relates to extruders and injection machines of the type in which a screw rotatable within a barrel is employed to extrude or inject resinous material from the outlet end of the barrel.

A plasticating extruder receives polymer pellets or powder, heats and works the polymer sufficiently to convert it to a melted or plastic state and delivers the melted polymer under pressure through a restricted outlet or die. It is desirable that the extrudate be fully melted, homogeneously mixed and uniform in temperature and viscosity.

The basic extruder apparatus includes an elongated cylindrical barrel which may be heated at various locations along its length and a screw which extends longitudinally through the barrel. The screw has a core with a helical flight thereon and the flight cooperates with the cylindrical inner surface of the barrel to define a helical valley for passage of the resin to the extruder outlet opening or injection front chamber. Although the pitch of the flight can vary, it is common to utilize screws of constant pitch. The pitch is the forward distance traversed in one full revolution of the flight. The screw is rotated about its own axis to work the plastic material and force it toward the outlet end of the barrel.

An extruder screw ordinarily has a plurality of sections along its axial extent with each section being suited to the attainment of a particular function. Ordinarily, there is a feed section, a transition section and a metering section, in series. In some extruders, these sections are followed by a vent section plus a second transition section and a second metering section. The extruder screw feed section extends beneath and forwardly from a feed opening where polymer in pellet or powder form is introduced into the extruder to be carried forward along the inside of the barrel. The depth of the helical valley of the screw in the feed section is usually large enough to over-feed the solid polymer. The over-feeding action serves to compact and pressurize the polymer particles and form a solid bed of advancing material in the extruder.

The material is worked and heated so that melting of the polymer occurs as the material is moved along the screw. Solids conveying and compaction occur in the feed section. Most of the melting occurs in the transition section. Most of the melting occurs near the barrel surface at the interface between a thin melt film and the solid bed of polymer. This general pattern persists until a substantial portion of the polymer reaches the molten state. After some 40 to 80 percent of the polymer has been melted, which usually occurs in the transition section, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

The melt is passed through the transition section wherein the root depth of the helical passageway is reduced to reflect the volume reduction due to melting of the feed. The reduction of depth in the transition section also compresses the solid. The transition section leads to a metering section, which has a shallow root depth helical passageway. Generally, the metering section begins where the resin is at least 90 percent melted.

SUMMARY OF THE INVENTION

This invention relates to a plasticating apparatus including a rotating screw having a helical flight disposed within and cooperating with the inner wall of a heated barrel provided with inlet and outlet openings. Particles of resinous material are introduced through said inlet opening to a helical valley extending along said flight and said particles are plasticated by said screw and advanced towards said outward opening. A barrier extends along the helical valley between facing portions of said helical flight to divide said helical valley into coextensive helical valley sections. The barrier extends in a non-parallel path having an alternating direction with respect to the helical flight so that the pitch of the barrier is alternately greater than and less than the pitch of the helical flight, without the barrier intersecting the helical flight. The height of the barrier is less than the height of the flight so that the resinous material being worked overflows the barrier due to changes in width of the helical valley sections.

Successive sections of the barrier can be straight with a bending angle being defined between the successive sections to provide a zigzag path. If desired, the path of the barrier can be wavy or serpentine. The wavy path can be essentially sinusoidal, if desired. No matter what specific path is defined by the barrier, the alternating path of the barrier causes the barrier to successively approach and withdraw from the flight in the direction of resin flow without intersecting the flight.

Coextensive helical valley sections are defined between the central barrier and the facing portions of the helical flight on opposite sides of the barrier. Because the direction or path of the barrier is non-uniform with respect to the direction or path of the helical flight, the widths of the side by side helical valley sections continuously change in a manner such that as the helical path on one side of the barrier narrows the helical path on the other side of the barrier widens by a corresponding amount, and vice versa. Narrowing of the helical path results in reducing the cross sectional area along the flow path while widening of the helical path results in increasing the cross sectional area along the flow path. Thereby, as resin flowing in the narrowing path is deprived of space it is squeezed out of the narrowing path over the top of the barrier and into the adjacent widening path, creating a tumbling and mixing movement in the resin. Later in the flow path, the path which previously was widening starts to become narrower while the adjoining path on the other side of the barrier which was previously narrowing correspondingly starts to become wider so that the resin again flows over the top of the barrier, but in a reverse direction. This back-and-forth movement over the top of the barrier can continue for the entire length of the barrier. It is noted that preferably the barrier should not intercept the helical flight because in that case the barrier would tend to periodically dam the flow path.

In terms of process, this invention relates to a method for plasticating resinous material in a molten state comprising feeding resinous material in a solid state to a screw having a helical flight and rotated in a barrel having a cylindrical inner surface with said flight cooperating with said inner surface to move said material along a helical path. Heat is applied to said barrel and to said material while working the material between the barrel and the screw to convert it to a molten state with no more than a minor amount of unmelted particles.

The material is passed in the molten state at substantially a constant flow rate through a metering section having a helical valley defined by said helical flight. A barrier extends along the helical valley between facing portions of said helical flight with the height of said barrier being lower than the height of said flight and with said barrier extending in a non-parallel path and having an alternating direction with respect to the helical flight without intersecting said helical flight so that said barrier divides said helical valley into first and second coextensive helical valley sections of continually varying cross-sectional areas in the direction of flow. Said material in the molten state passes in tumble mixing flow first in one direction then in the other direction over said barrier during passage through the metering section.

The tumble mixing flow from one side of the barrier to the other side during passage through the metering section provides turbulence and a massaging effect on the fluid resin. This effect provides many advantages. It tends to mix hot liquid and cooler solid material to help accomplish melting of all resinous material in the metering section. It accomplishes a high degree of mixing of all components in the system, such as different resins and color bodies. It reduces excessive shearing forces on the molten resin. It tends to avoid temperature and viscosity differentials in the flowing resin.

BRIEF DESCRIPTION OF THE DRAWINGS

This invention is illustrated in the accompanying figures wherein.

DESCRIPTION OF THE PREFERRED EMBODIMENTS

Figure 1:
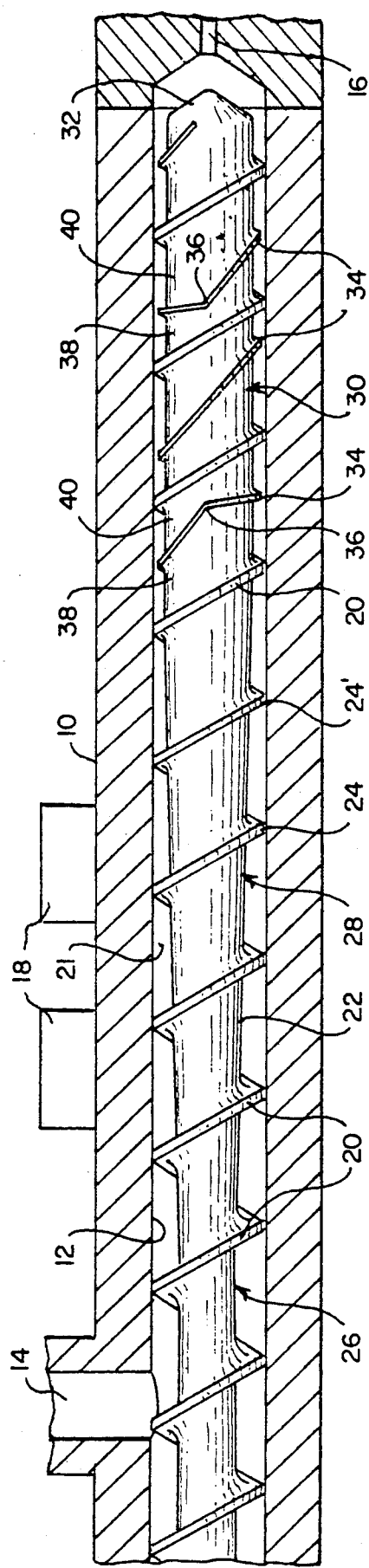
FIG. 1 shows a cutaway view of an extruder screw plasticating apparatus.

FIG. 1 shows an extruder screw plasticating apparatus including a cylindrical barrel 10 having a cylindrical inner surface 12. Barrel 10 is provided with inlet port 14 for the admission of one or more solid particulate resinous materials and any required additives or agents and discharge port 16 for the discharge of plasticated molten extrudate. Any conventional heating means 18 can be provided on the outside of barrel 10 for applying heat to barrel 10.

Within barrel 10 is a screw which is rotatable by means not shown. The screw includes a single continuous helical flight 20 winding around core 22. Flight 20 includes flight land 24 which moves in close cooperative association with respect to inner surface 12 of barrel 10. The axial distance between comparable points on adjacent flights, as shown at 24-24', represents the pitch of the flight.

Flight 20 defines a helical valley 21 bounded by flight 20, inner surface 12 of barrel 10 and the surface of core 22. The surface of the valley on core 22 is the root or channel of the valley. The screw includes a relatively deep channel feed section 26 for the admission, heating and working of solid feed resin, a transition section 28 of reducing channel depth to adapt to the reduced volume of resin due to elimination of air spaces between the solid particles, and a relatively shallow channel metering or pumping section 30 wherein the resin is predominantly in the molten state with only a minor amount of solid particles remaining or no solid particles. A discharge cone or valve 32 is employed.

A barrier member 34 extends along valley 21 formed by flight 20. Barrier member 34 may be formed during manufacture of the screw by casting or machining of the valley surface or it may comprise a metal strip welded onto the valley surface after the screw has been manufactured. Barrier 34 can be located in any region of the screw, but is preferably located in the metering section, wherein the depth of the valley is generally shallow and uniform. Barrier member 34 is not as high as flight 20 so that there is a sufficient clearance between barrier member 34 and inner surface 12 of barrel 10 to permit melted polymer to flow over barrier 34, as explained below.

Barrier member 34 is not parallel to flight 20. It can have a pitch which is sometimes greater and sometimes less than the pitch of flight 20 because of at least one or a plurality of flexure or blending points 36, which can impart a zigzag configuration to the path of barrier 34. On one side of flexure point 36 the pitch of barrier 34 can be greater than the pitch of flight 20, and on the other side of flexure point 36 the pitch of barrier 34 can be less than the pitch of flight 20. A plurality of flexure points 36 can be utilized so that barrier 34 does not intersect flight 20. Flexure points can also be used which change the amount by which the pitch is greater or less than the pitch of flight 20.

The alternating path of the barrier 34 can cause the barrier to successively approach and withdraw from flight 20 in the direction of resin flow without contacting the flight. Coextensive valley sections 38 and 40 are defined between barrier 34 and facing portions of flight 20 on opposite sides of the barrier. Because the direction or path of barrier 34 is non-uniform with respect to the direction or path of helical flight 20, the widths of the side by side helical valley sections 38 and 40 continuously change in a manner such that as the helical path on one side of barrier 34 narrows the helical path on the other side of the barrier widens by a corresponding amount, and vice versa.

Figure 2:
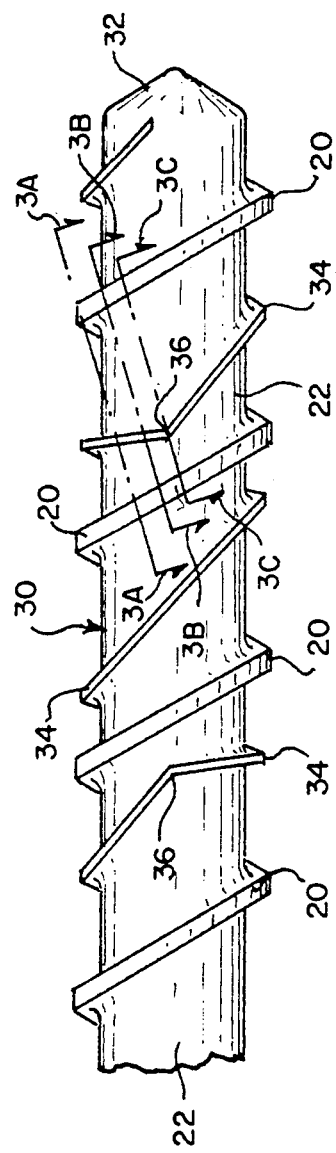
FIG. 2 presents a blown-up view of the metering section of the screw of FIG. 1.
Figure 3A:
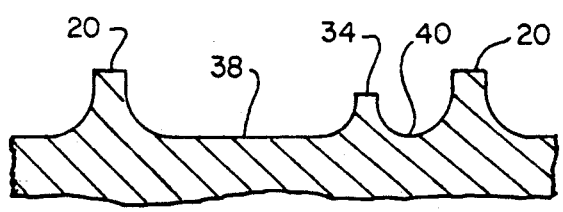
FIGS. 3A, 3B and 3C present three consecutive cross-sectional views taken through the metering section of FIG. 2.
Figure 3B:
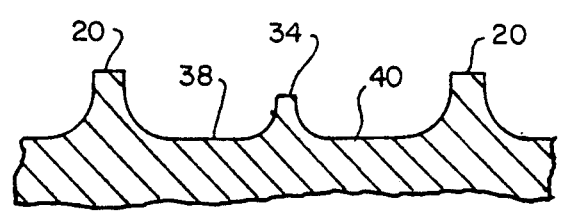
Figure 3C:
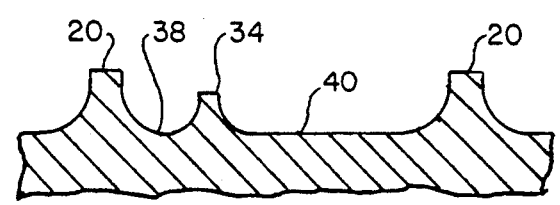

This effect is apparent from FIGS. 1 and 2 but it will be even more apparent from FIGS. 3A, 3B and 3C, which represent respective views through three indicated cross-sections taken through FIG. 2. As is clear from FIGS. 3A, 3B and 3C, as the helical screw rotates in the direction of flow, helical valley section 40 progressively becomes larger (wider) in size while helical valley section 38 becomes correspondingly smaller (narrower) in size. Although not shown in FIGS. 3A, 3B and 3C, continued rotation will result in helical valley section 38 becoming progressively larger while helical valley section 40 becomes correspondingly smaller. This continual size transference will continue until barrier member 34 terminates.

Figure 4:
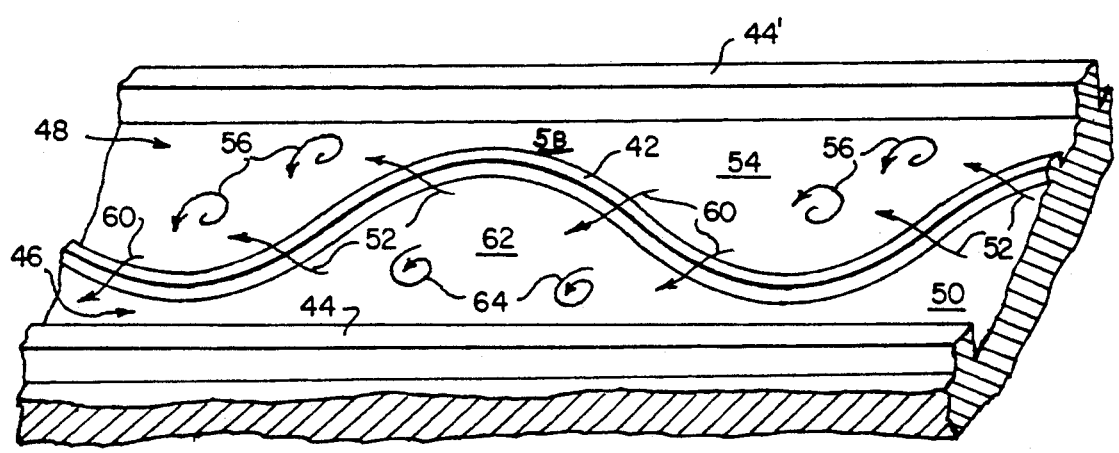
FIG. 4 is a diagram illustrating the tumbling and mixing action occurring in the metering section.

The functional effect of this volume transference between side by side helical valley sections is illustrated in FIG. 4. FIG. 4 is a computer assisted design diagram showing barrier member 42 having the configuration of a sine wave. Barrier 42 extends through the valley established by a flight denoted as 44-44'. Valley section 46 extends from one side of barrier 42 to the flight at position 44 and valley section 48 extends from the other side of barrier 42 to the flight at position 44'. It will be noticed that as the width of valley section 46 increases, the width of valley section 48 correspondingly decreases, and vice versa. FIG. 4 shows that in the valley section 50 the width is diminishing while the width of adjoining valley section 54 is correspondingly increasing so that molten resin in section 50 overflows barrier 42 in the direction indicated by arrows 52 and then tumbles in a turbulent manner into valley section 54 as indicated by arrows 56.

In like manner, in the valley section 58, the valley width is diminishing while the width of adjoining valley section 62 is correspondingly increasing so that molten resin in section 58 overflows barrier 42 in the direction indicated by arrows 60 and then tumbles in a turbulent manner into valley section 62, as indicated by arrows 64. This sequence is continually repeated as indicated by the unnumbered arrows in FIG. 4 until barrier 42 is terminated.

The root level or depth of valley sections 46 and 48 will usually be equal. The tumbling turbulence and massaging effect on the fluid resin illustrated in FIG. 4 provides many advantages. First, it tends to mix hot liquid and cooler solid material by imparting turbulence to a laminar flow stream to help accomplish melting of all the resinous material in the metering section or elsewhere on the screw. Secondly, it accomplishes a high degree of mixing of all components in the system, such as different resins and color bodies to provide a homogeneous product of uniform color. Thirdly, it reduces shearing forces on the molten resin, thereby further tending to avoid overheating. Further, it tends to avoid temperature and velocity gradients in the flowing resin stream. Fifthly, it guarantees that all resin must transit through a series of zones of essentially non-uniform width and non-uniform cross-sectional area.

We claim:

1. A plasticating apparatus including a rotating screw and a heated barrel with said rotating screw having a helical flight disposed within and cooperating with the inner wall of said heated barrel wherein said barrel is provided with inlet and outlet openings and wherein particles of resinous material are introduced through said inlet opening to a helical valley extending along said flight to be plasticated by said screw and advanced towards said outlet opening, a barrier extending along said helical valley to divide said helical valley into coextensive side by side helical valley sections, said barrier extending in a path which is non-parallel and alternating with respect to said helical flight so that the pitch of said barrier is alternately greater than and less than the pitch of said helical flight but said barrier does not contact said flight, the height of said barrier being less than the height of said flight so that said resinous material overflows said barrier due to changes in width of said side by side helical valley sections.

2. The apparatus of claim 1 wherein successive sections of said barrier have a uniform direction with a bending angle being defined between said successive sections so that said barrier successively approaches and retracts from said flight.

3. The apparatus of claim 1 wherein the path of said barrier is wavy.

4. The apparatus of claim 1 wherein the path of said barrier is essentially sinusoidal.

5. The apparatus of claim 1 wherein said rotating screw has a metering section and said barrier is disposed in said metering section.

6. A process for plasticating resinous material in a molten state under pressure comprising:
    feeding resinous material in the solid state to a screw having a helical flight and rotated in a barrel having a cylindrical inner surface with said flight cooperating with said inner surface to move said material along a helical path,
    applying heat to said barrel and said material while working said material between the barrel and the screw to convert said material to the molten state with a minor amount of unmelted particles,
    passing said material in the molten state through a helical valley defined by said helical flight, with a barrier whose height is lower than the height of the helical flight extending along said helical valley in a non-parallel path and in an alternating direction with respect to said helical flight but said barrier does not contact the helical flight so that coextensive valley sections are defined on adjacent sides of said barrier with the width of one valley section narrowing while the width of the adjacent valley section is widening in the direction of flow and vice versa,
    said material in the molten state passing in tumble mixing flow over said barrier during passage through said helical valley, and
    the direction of flow over said barrier being in response to the narrowing and widening of said valley sections so that said flow over said barrier is sequentially in one direction and then in the opposite direction.

7. A process for plasticating resinous material in a molten state comprising:
    feeding resinous material in the solid state to a screw having a helical flight and rotated in a barrel having a cylindrical inner surface with said flight cooperating with said inner surface to move said material along a helical path,
    applying heat to said barrel and said material while working said material between the barrel and the screw to convert said material to the molten state with only a minor amount of unmelted particles,
    passing said material in the molten state at a substantially constant flow rate through a metering section having a helical valley defined by said helical flight,
    the bottom surface of said helical valley comprising the root of a channel extending in a helical path with a barrier whose height is lower than the height of the flight extending along said channel with said barrier extending in a path which is non-parallel and alternating with respect to the helical flight so that the pitch of said barrier is alternately greater than and less than the pitch of the helical flight but said barrier does not contact the helical flight so that coextensive valley sections are defined on the adjacent sides of said barrier with the width of one valley section narrowing while the width of the adjacent valley section is widening in the direction of flow, and vice versa,
    said material in the molten state passing in tumble mixing flow over said barrier during passage through said helical valley, and
    the direction of flow over said barrier being alternately in one direction then in another direction in response to the alternate narrowing and widening of said valley sections.

8. The process of claim 6 wherein successive sections of said barrier have a uniform direction with a bending angle being defined between said successive sections.

9. The process of claim 6 wherein the path of said barrier is wavy.

10. The process of claim 6 wherein the path of said barrier is essentially sinusoidal.

11. The apparatus of claim 1 wherein said coextensive side by side helical valley sections have substantially the same depth.

12. The process of claim 6 wherein said coextensive valley sections defined on adjacent sides of said barrier have substantially the same depth.

13. The process of claim 7 wherein said coextensive valley sections defined on adjacent sides of said barrier have a substantially the same depth.

14. The apparatus of claim 1 wherein said barrier extends along a region of said helical valley wherein the depth of said valley is substantially uniform.

15. The process of claim 6 wherein said barrier extends along a region of said valley wherein the depth of said valley is substantially uniform.

16. The process of claim 7 wherein the depth of said channel root over which said barrier extends is substantially uniform.

* * * * *